A. W. MacMILLAN.
SURVEYING APPARATUS.
APPLICATION FILED APR. 6, 1917.
1,253,069.
Patented Jan. 8, 1918.
2 SHEETS—SHEET 1.
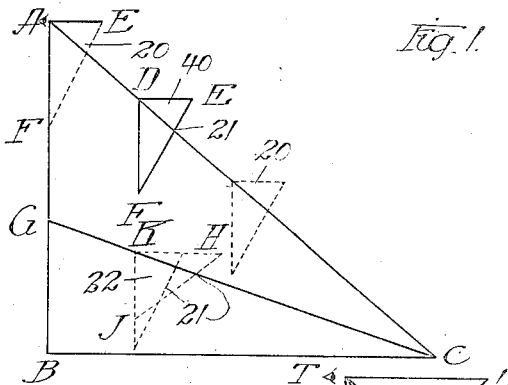
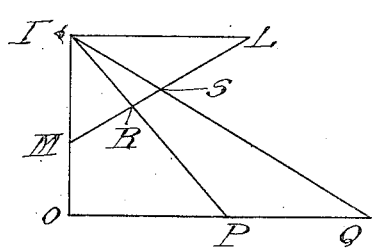
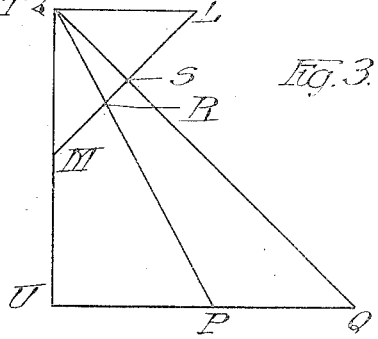
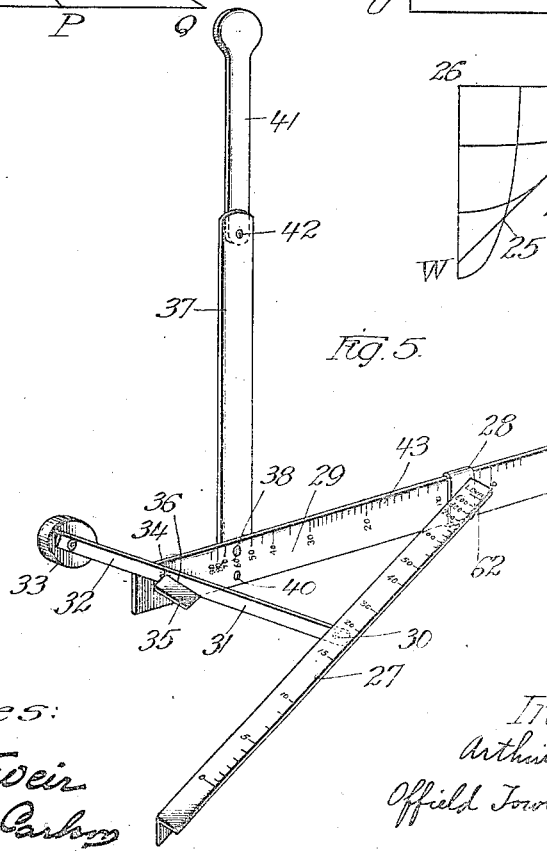

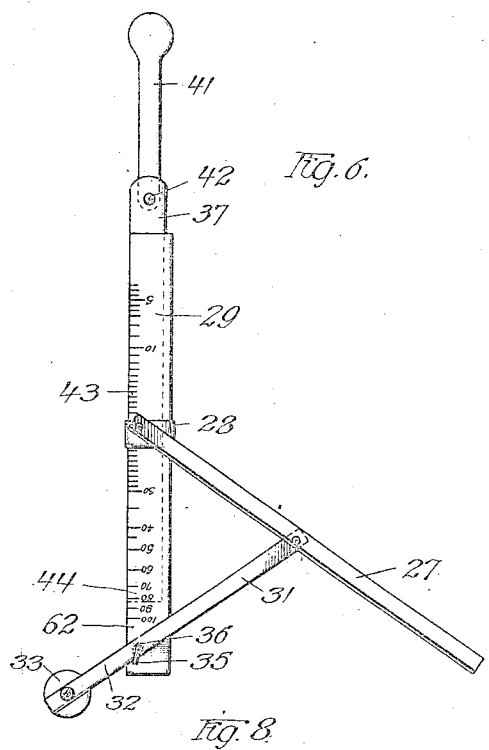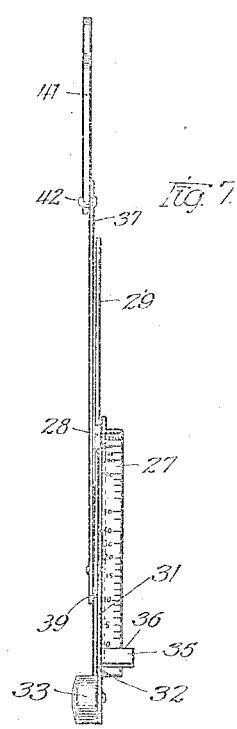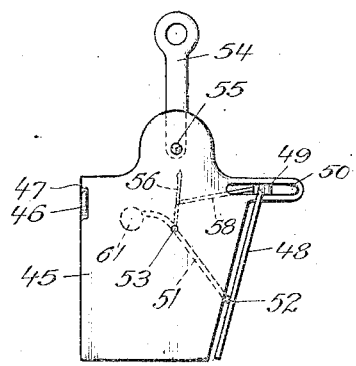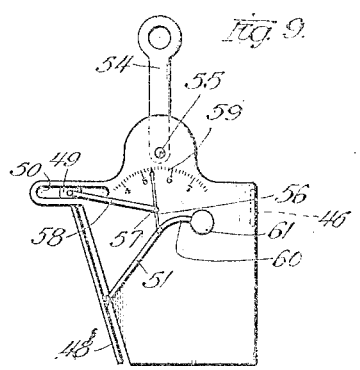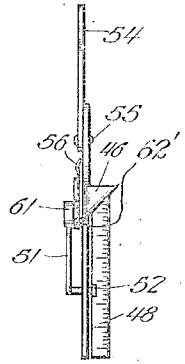

UNITED STATES PATENT OFFICE.

ARTHUR W. MacMILLAN, OF CHICAGO, ILLINOIS.

SURVEYING APPARATUS.

1,253,069. Specification of Letters Patent. Patented Jan. 8, 1918.

Application filed April 6, 1917. Serial No. 160,124.

*To all whom it may concern:*

Be it known that I, ARTHUR W. MACMILLAN, a citizen of the United States, residing at Chicago, in the county of Cook and State of Illinois, have invented certain new and useful Improvements in Surveying Apparatus, of which the following is a specification.

My invention, which relates to improvements in surveying apparatus, is particularly adapted for measuring distances and heights.

The principal objects of the invention are, to provide a direct reading device which determines distances or heights without laborious mathematical computations; to provide a device of an exceedingly simple form and capable of being utilized without the necessity of troublesome manipulations; to provide a portable device of the character described which may be contained within very small compass, thereby enabling it to be carried conveniently in the field; to provide a device having a permanent setting and in which a reading may be taken instantaneously at will; to provide a device so organized that it may be conveniently adjusted to conform to given data or conditions; to provide a single device of the class described which may be used for measuring either horizontal or vertical distances; to provide a device which shall be simple in design and inexpensive to manufacture, and, in general, to provide an improved surveying device of the character described.

In the drawings, which illustrate specific embodiments of the invention—

Figures 1, 2, 3, and 4 are diagrams showing the principle of the invention;

Fig. 5 is a perspective view of a single device which may be utilized for measuring horizontal or vertical distances, but shown arranged for horizontal measurements;

Fig. 6 is a side elevation of the device shown in Fig. 5, arranged for showing vertical distances;

Fig. 7 is an end elevation of the device shown in Fig. 6, looking from the left-hand side of the figure;

Fig. 8 is a front side elevation of a modified form of the device particularly designed for use by photographers for measuring horizontal distances only;

Fig. 9 is a rear side elevation of the device shown in Fig. 8; and

Fig. 10 is an end elevation of the device shown in Fig. 8, looking from the left of the figure.

In practising my invention, I make use of the well known law of trigonometry that when one side of a right-angle triangle and one of the acute angles of said triangle are known, any other side of the triangle may be readily calculated. For obvious reasons, I prefer to establish my right-angle triangle in such a position that the sides inclosing the angle of the triangle are in horizontal and in vertical relation.

In Fig. 1, which illustrates the principle as applied to the measurement of horizontal distances, the distance A—B represents the height of the eye above a horizontal base line B—C, which is the horizontal distance to be measured between the observer A and the object C. It is manifest that the unknown distance B—C may be readily determined by simply measuring the angle B—A—C and making the necessary mathematical computations. As has been previously stated, one of the principal objects of my invention is to avoid the necessity of such calculations. To this end, I establish between the eye A and the object C what in effect amounts to a triangular figure 20 having one side D—E horizontal, and another side D—F vertical. As shown in Fig. 1, the triangle D—E—F is interposed between the eye A of the observer and the object C in such relation that the points A, D, and C are in the same straight line. It should be noted in this connection that it is immaterial in what position the triangle 20 is to be placed, provided that it be held in the same position relative to the horizontal and with the point D in line with the points A and C. Having established such a triangle D—E—F in the line of sight between the eye A and the object C, it will be easily understood that the position of the point 21 in the line E—F corresponds to the ratio between the lengths B—C and A—B. In this connection, it should be noted that the inclination selected for the hypotenuse E—F may be, and is, arbitrarily selected without reference to other data, hence, the distances between the point 21 and the points E and F bear no direct fixed ratio to the distances A—B and B—C, but are a trigonometrical function thereof.

Having established a predetermined height of eye A—B and an arbitrary triangle D—E—F, I am enabled to make the device direct reading by suitably graduating the line E—F so that when the point D of the triangle D—E—F is held in a line between the eye A of the observer and the object C, the graduation reading at the point 21, where the line of sight intersects the hypotenuse E—F, gives directly, without further calculation, the actual distance between the points B and C.

As has been previously stated, the triangle D—E—F may be held in any position between the eye A of the observer and the objective C, provided,—first, that its vertical relation be maintained; second, that the line of sight intersect the point D; and, third, that the datum height A—B be fixed. If, however, the height of the eye A be changed to G, the datum line G—B is changed correspondingly; and if the triangle D—E—F be held in the position shown at 22, the line of sight G—D—C will not intersect the point 21 and the reading will be incorrect. If, therefore the same device is to be used for different heights of eye, different sets of graduation must be employed for the hypotenuse E—F if the same triangle is to be used.

As an important feature of my invention, I have discovered that the necessity of supplying different sets of graduations for the hypotenuse E—F is overcome if the inclination of said hypotenuse E—F be changed to correspond with the changed height of eye. In Fig. 1, H—J represents the original hypotenuse E—F with its original graduations unchanged, as shown, so as to establish a differently shaped right-angle triangle suitable for use with the height G—B. It will be observed in this case that the point 21 is now in line with the points G, K, and C.

In developing my invention, the question arose whether the mere changing of the inclination of the graduated hypotenuse of my triangle would enable the device to be used for a different eye height to measure all horizontal distances, or whether the new condition was true for only one particular horizontal distance. By mathematical calculations I have proved that the graduations on the hypotenuse E—F, if correct for one height and one inclination of the hypotenuse E—F, are correct for all other heights of eye and other horizontal distances provided, of course, that the inclination of said hypotenuse E—F be adjusted to correspond with the particular height of eye, the length of the hypotenuse E—F being of course maintained constant. However, for those who do not care to spend the time necessary to go into the mathematical formulæ involved in such calculations, I have shown the principle proved diagrammatically in Figs. 2 and 3. Fig. 2 shows a hypotenuse of arbitrary length L—M suitably graduated and adjusted at the proper inclination to correspond with the height N—O of the eye. When so adjusted, the distances O—P and O—Q are correctly determined by reading the graduations at the points R and S intersected by the line of sight N—P and N—Q. It should be understood that the point M represents the zero mark of the hypotenuse scale, and the point L represents infinity.

Fig. 3 shows the same hypotenuse L—M differently inclined to correspond with an increased height of eye T—U. By measurement of Figs. 2 and 3, it will be found that if the new inclination of the hypotenuse L—M be adjusted to bring the point S, for instance, in line with the line of sight between the point T and the same object Q as in Fig. 2, then the point R must also be in line with the object P. Hence, the same hypotenuse, suitably graduated with a single set of markings, can be used for different eye heights if the inclination of the hypotenuse be changed to correspond.

In practice, the most convenient way to establish a right-angle triangle with its legs D—E and E—F in proper vertical and horizontal position, is to suspend the same from a pivotal point located exactly above the center of gravity of the particular device employed. This makes it necessary to consider the shifting of the center of gravity of the hypotenuse L—M incident to the changing of its inclination to correspond with different heights of eye.

Fig. 4 is intended to show the loci of various points 23, 24 and 25 on the hypotenuse V—W, by which it will be seen that the locus of the central point 24 of the hypotenuse V—W is in the arc of a circle described from the sight apex 26. Therefore, by making the hypotenuse V—W of proper dimensions to bring its center of gravity at the central point 24, the correction for the change in the center of gravity of said hypotenuse may be effected by pivotally connecting the point 24 to the point 26 and placing a counterpoise on the end of an extension of the link 24—26 at a suitable distance beyond the point 26.

In Fig. 5, which represents what may be termed a universal type of device, 27 represents the graduated hypotenuse and comprises a small metal angle, the upper end of which is pivotally connected to a shoe 28 capable of sliding movement upon the horizontal frame bar 29. The central point 30 of said hypotenuse bar 27 is pivotally connected to the end of the bar 29 by means of a link 31, the rear extension 32 of which carries a counterweight 33. On the link 31 and at the pivotal axis 34 is mounted a small laterally projecting horizontal shelf or knife 35 provided with a sighting edge 36 precisely coincident with the pivotal axis 34. The device so far described is suspended in correct vertical and horizontal position from an upright flat bar 37, the lower end of which is secured to the bar 29 by means of a rivet 38 passing exactly through the center of gravity of the device. To prevent pivotal movement of the suspending arm 37 and the functional parts of the device, the resilient lower end of the bar 37 is provided with a cone-shaped projection 39 (see Fig. 7) which enters a small aperture 40 in the bar 29, thus making the bar 37 rigid with the other functional parts of the device. The device as a whole is suspended in vertical position from a finger-piece or handle 41, the lower end of which is pivotally connected to the upper end of the bar 37 at 42. It will be understood that the distance between the pivotal point 42 and the center of gravity 38 is considerable so as to prevent friction of the pivot 42 from seriously interfering with the perpendicularity of the apparatus.

When the device is utilized for measuring horizontal distances, the bar 37 is swung up into the self-locking position shown in Fig. 5 and the shoe 28 is adjusted along the scale 43 to correspond with the height of the eye of the observer above the objective. If the observer is standing on a level street or floor, a remote objective point on the floor level will be in the neighborhood of five feet below the eye, depending, of course, on the tallness of the observer. There is sufficient friction in the shoe 28 to prevent improper movement thereof, when once adjusted. The sliding of the shoe 28 along the bar 29 results in a swinging movement of the hypotenuse arm 27 and a corresponding pivotal movement of the link 31. However, by reason of the fact that the locus of the central point of the hypotenuse bar is the arc of a circle having its center at the apex 34, the zero point of the hypotenuse scale moves in a vertical line below the sight edge 36, the path of movement of said zero point representing the theoretical vertical side of the surveying triangle heretofore referred to. Having set the instrument to the height of the observer's eye above the objective, the device is suspended from the finger-piece 41 and a sight is taken across the knife edge 36 and to the object. The graduation from the hypotenuse bar 27 intersected by said line of sight, represents the horizontal distance between the observer and the object.

For measuring vertical distances, the same relation and conditions apply. If Figs. 1, 2, 3, 4, and 5 be turned through an angle of ninety degrees in an anti-clockwise direction so as to change the former vertical line into a horizontal base line, and, assuming that such horizontal base line is known, the graduated hypotenuse is available for measuring heights in a manner similar to the measurement of the horizontal distances. When using the device of Fig. 5 for the measurement of heights, the supporting bar 37 is swung into line with the datum bar 29, as shown in Figs. 6 and 7, the locking projection 39 engaging in the locking aperture 44 in said datum bar 29 so as to maintain the latter in vertical position. Before measuring distances of the objective above the eye, the shoe 28 is of course adjusted along the scale 43 until the pivotal point of said shoe 28 registers with the graduation corresponding to the horizontal distance of the eye of the observer from the objective. The device is then suspended by means of the finger-piece 41 above the eye and between the eye of the observer and the objective, the height distance being directly read off on the hypotenuse bar 27.

To those skilled in the art, it will be manifest that the device may be modified readily to permit depression distances of the object to be measured, as well as elevations.

The modification shown in Figs. 8, 9, and 10 is one which I have designed especially for use by photographers, in order to enable them to quickly and with reasonable accuracy measure the distance between the camera and the object which is to be photographed. The device, as shown, is extremely compact and capable of being used with great rapidity. In said device, 45 represents a small aluminum casting or stamping having an angular projection 46 with a sight edge 47. The hypotenuse bar 48 is provided with the customary single scale, and is pivoted at its upper end onto a small block 49 adapted to slide in a slot 50, the center line of which is in line with the sighting edge 47. The movement of the lower part of the hypotenuse bar 48 is controlled by means of a link 51, the lower end of which is pivotally connected to the hypotenuse bar at 52, and the upper end thereof is pivotally connected to the frame piece 45 at 53. The locations of the pivotal pins 52 and 53 are such that for a limited range of sliding movements of the block 49, the theoretical locus of the point 52 in the theoretical surveying triangle is substantially coincident with the arc described by the lower end of said link 51. This is not mathematically accurate, but it is a sufficiently close approximation to answer for all practical purposes, the advantages arising from the compactness of the device more than outweighing the slight disadvantage caused by its slight deviation from theoretical accuracy.

The device is suspended from the finger-piece 54, the lower end of which is pivoted at 55 directly above the center of gravity of the apparatus, so that the sight edge 47 and the center of the slot 50 lie in a horizontal plane. Coincident with the pivotal pin 53 of the link 51, but independently of the latter, I provide a pointer arm 56, an intermediate point 57 of which is pivotally connected by means of link 58 to the rear of the sliding block 49. The end of the pointer 56 coöperates with a scale 59 marked on the back of the instrument and designates heights of persons corresponding to eye heights for which the inclination of the hypotenuse bar 48 may be adjusted. The link 51 has an extension 60 equipped with a suitable counterweight 61 for compensating for the shifting in the center of gravity of the hypotenuse bar 48 and associated parts incident to the adjusting of the device to suit persons of different heights. It is understood that the shape of the main frame of the instrument is such that the pivotal point 53 of the link 51 lies in the same vertical line as the center of gravity of the instrument and the pivotal point 53.

In the event that the terrain is not level, an artificial horizontal can be established by positioning a target held by an assistant over the objective in line with the level or infinity point 62 or 63 of the scale. The device having been adjusted for a height distance equal to the vertical spacing between the upper target and a lower target, a sight is then taken at the lower target, and the horizontal distance is read directly from the graduated oblique scale.

Although I have described only two modifications of my invention, it must be understood that it is capable of being embodied in other forms to suit individual requirements, or for different purposes, without sacrifice of efficiency. The invention, therefore, must be interpreted in a broad sense and is not intended to be narrowed by the specific details of construction specified, the only limitations being those imposed specifically by the prior art or by the express language of the claims.

I claim—

1. In a device of the class described, the combination of a sight, a support therefor, a scale intersecting the line of sight between the objective and the observer, and means for maintaining said support and said scale in the same angular position relative to the vertical.

2. In apparatus of the class described, the combination of a frame provided with a fixed sight, a scale crossing the line of sight between the observer and an object, the distance of which from a known base line is to be measured and spaced apart from said sight, and means for maintaining said frame and scale in the same angular position relative to the vertical and independently of the inclination of the line of sight.

3. In a device of the class described, the combination of a frame provided with a sight, a scale fixedly connected to and spaced apart from said sight and crossing the line of sight between the eye of the observer and the object, and suspension means for said frame and scale for supporting the same temporarily in the line of sight.

4. In a device of the class described, the combination of a frame provided with a sight and a graduated scale arranged to cross the line of sight between the observer and the object, and means for pivotally suspending said frame at a point spaced apart from and located above the center of gravity of said frame.

5. In a device of the class described, the combination of a sight located in the line of sight between the eye of the observer and the object, a scale inclined to the vertical and crossing the line of sight and provided with graduations, representing different perpendicular distances of the object from a base line passing through the eye of the observer, and means for adjusting the inclination of said scale according to the length of said base line.

6. In a device of the class described, the combination of a frame provided with a fixed sight and means for pivotally supporting the frame whereby it will always occupy the same position relative to the vertical, a scale movably mounted on said frame, crossing the line of sight and capable of being adjusted at various angles to the vertical, and compensating means controlled by movement of said scale relative to said frame for maintaining the center of gravity of the frame and associated parts in the same position.

7. In a device of the class described, the combination of a frame member provided with a sight, a member arranged to slide on said frame in line with said sight, a scale having one end connected to said sliding member, a link pivotally connecting an intermediate point on said scale with a point on said frame substantially coincident with a vertical line passing through the center of gravity of said frame, an extension on said link provided with a counterweight for said scale, and means for pivotally supporting said frame at a point vertically above its center of gravity.

8. In a device of the class described, the combination of a frame member provided with a sight, a member arranged to slide on said frame in line with said sight, a scale having one end connected to said sliding member, a link pivotally connecting an intermediate point on said scale with a point on said frame substantially coincident with a vertical line passing through the center of gravity of said frame, an extension on said link provided with a counterweight for said scale and means for pivotally supporting said frame at a point vertically above its center of gravity, said frame being provided with graduations indicating the extent of movement of said scale.

ARTHUR W. MacMILLAN.